(12) United States Patent
Stout

(10) Patent No.: US 12,742,470 B2
(45) Date of Patent: Sep. 22, 2026

(54) ZIPNUT SYSTEMS

(71) Applicant: Gordon Stout, Rice, TX (US)

(72) Inventor: Gordon Stout, Rice, TX (US)

( * ) Notice: Subject to any disclaimer, the term of this patent is extended or adjusted under 35 U.S.C. 154(b) by 356 days.

(21) Appl. No.: 18/605,317

(22) Filed: Mar. 14, 2024

(65) Prior Publication Data

US 2025/0290537 A1 Sep. 18, 2025

(51) Int. Cl.
*F16B 39/00* (2006.01)
*F16B 39/24* (2006.01)

(52) U.S. Cl.
CPC .................................... *F16B 39/24* (2013.01)

(58) Field of Classification Search
CPC ....................................................... F16B 39/24
See application file for complete search history.

(56) References Cited

U.S. PATENT DOCUMENTS 1,788,735 A * 1/1931 Olson ..................... F16B 39/24 470/42
7,950,886 B2 * 5/2011 Siegal ..................... F16B 39/22 411/525
10,493,890 B2 * 12/2019 Zhang .................... B60N 3/046
11,441,588 B1 * 9/2022 Bradford ............... F24S 25/617
2007/0086874 A1 4/2007 Sullivan et al.

* cited by examiner

*Primary Examiner* — Amy J. Sterling
(74) *Attorney, Agent, or Firm* — Lori Woodward

(57) ABSTRACT

An apparatus, the zipnut an alternative solution for a nut on a bolt. The main advantage is that it can fit many sizes of bolts where common nuts must be exact for each bolt. The device contours to the bolt as it is being pushed/threaded through.

20 Claims, 5 Drawing Sheets

ZIPNUT SYSTEMS

CROSS REFERENCE TO RELATED APPLICATION

The present application is related to and claims priority from prior provisional application Ser. No. 63/452,276, filed 15 Mar. 2023 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of fastening means and more specifically relates to fasteners.

2. Description of the Related Art

Many times it is desirable to fasten items together for construction of builds and other applications. Often bolts or screws may be used for the hardware. Screws are driven into the host via rotational movement. Bolts are often attached to nuts and washers may be used as well. There are many different types of threads which may be inconvenient to match to. It is desirable to have a more flexible means for using bolts or other fasteners to secure them in place.

Various attempts have been made to solve the above-mentioned problems such as those found in U.S. Pub. No. 2007/0086874 to Paul Sullivan. This art is representative of reactive fasteners. None of the above inventions and patents, taken either singly or in combination, is seen to describe the invention as claimed.

Ideally, a fastening means should provide convenient and secure fastening and yet would operate reliably and be manufactured at a modest expense. Thus, a need exists for a reliable zipnut to avoid the above-mentioned problems.

BRIEF SUMMARY OF THE INVENTION

In view of the foregoing disadvantages inherent in the known fastener art, the present invention provides a novel zipnut system. The general purpose of the present invention, which will be described subsequently in greater detail, is to provide a convenient and effective fastening means.

A zipnut system is disclosed herein preferably comprising at least one zipnut. The zipnut comprises a flexible vane which presses to the bolt; a serrated edge used for grip; and fins which feed into and grip the bolt threads. The initial flat profile allows for ease of packing and shipping. The profile is also thin so it can be used in many instances where a thicker profile is not suitable. In certain instances, it can act in a multipurpose capacity as a washer/nut. The device may comprise any suitable hard plastic, nylon or other such malleable material. Stiff edges on the bottom of the zipnut ‘grab’ onto and hold the threads of the bolt as the zipnut is engaged with the bolt. Preferably 4 stiff petals bend upwardly as it is engaged with the bolt.

The zipnut is able to be fully engaged with the bolt and the threads are able to line up. The bolt may be driven through the zipnut into a coupled relationship and be uncoupled as desired. A method of use is also described herein.

A zipnut system is disclosed herein, in a preferred embodiment, comprising: a zipnut with a flexible circular plate having an outer-circumference, an inner-circumference, a top-surface, a bottom-surface, and a thickness, wherein the circular plate is defined by the outer-circumference offset from the inner-circumference by a distance, the top-surface is preferably integral with the bottom-surface via the thickness, wherein the top-surface is planar in a non-use condition and deforms accordingly to an extent engaged in an in-use condition. The flexible circular plate comprises at least four channels extending from the inner-circumference. The bottom-surface comprises female-threads extending between each of the at least four channels (having a different configuration before use); the female-threads oriented at 90 degrees to each adjacent the female-threads (during the non-use condition), separated by a respective the channel(s), wherein the female-threads are configured to engage with male-threads on a fastener and progressively deform the flexible circular plate as the male-threads rotatingly-advance in relation to the female-threads. In the in-use condition, the angles of the female-threads change to accept the male threads as they advance through, yet accept the rotation of the male-threads as they engage. The female-threads deform with the movement of the male-threads to maintain a positive engagement as it progresses.

The at least four channels preferably form an X-shape, each of the at least four channels and the inner-circumference comprise a combined negative volume The female-threads comprise fins. The outer-circumference comprises a serrated edge, wherein the serrated edge comprises a gripping means for gripping engagement to manipulate the zipnut as desired for tightening and loosening actions. Each of the at least four channels are narrower adjacent to the inner-circumference than as they approach the outer-circumference. The narrow portion increases in distance as it approaches the outer-circumference. Thus, the distance across the channel between the channel is greater adjacent to the outer-circumference in relation to the distance across the inner-circumference.

The zipnut comprises a flexible vane, wherein the flexible vane is substantially arcuate (at each position related to channels) to allow for maximum flexibility. The flexibility is critical to and relational to deformation, wherein the deformation comprises biasing in compression. The biasing is at a friction-fit tolerance to maintain a positive grip between the zipnut and the fastener. The zipnut is able to move exclusively in relation to the fastener and alternately the zipnut is able to move in relation to the fastener to attach the fastener to an object such as an object held between or other. Referring now to the serrated edge; the serrated edge comprises vertical grooves (in relation to if the device was set flat on a planar surface) along the outer-circumference, wherein the vertical grooves are inset into and limited via the thickness, and wherein the zipnut functions to removably secure the fastener to an extent desired.

A method of using a zipnut system is also disclosed herein, comprising the steps of: step one providing a zipnut system as disclosed herein including a zipnut with a flexible circular plate having an outer-circumference, an inner-circumference, a top-surface, a bottom-surface, and a thickness, wherein the circular plate is defined by the outer-circumference offset from the inner-circumference, the top-surface integral with the bottom-surface via the thickness, wherein the top-surface is planar in a non-use condition and deforms accordingly to an extent engaged in an in-use condition, wherein the flexible circular plate comprises at least four channels (more or less in alternate embodiments) extending from the inner-circumference, wherein the bottom-surface comprises female-threads extending between each of the at least four channels, the female-threads oriented at 90 degrees to each adjacent the female-threads, separated by a respective the channel, wherein the female-threads are configured to engage with male-threads on a fastener and progressively deform the flexible circular plate as the male-threads rotatingly-advance in relation to the female-threads. As such, the zipnut, as designed, functions to removably secure the fastener to an extent desired, and step two threadingly engage the fastener with the zipnut to cause a deformation of the zipnut. The method may further comprise the step three of tighteningly engage the zipnut in relation to the fastener via the serrated edge, and the step four of looseningly engage the zipnut in relation to the fastener via the serrated edge.

The present invention holds significant improvements and serves as a zipnut system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, the zipnut system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a fastening means and more particularly to a zipnut system as used to improve the efficiency of fastening.

Generally speaking, the zipnut is an alternative solution for a nut on a bolt. The main advantage is that it can fit many sizes of bolts where common nuts must be exact for each bolt. As designed, it is able to contour to the bolt as it is being pushed/threaded through.

Figure 3:
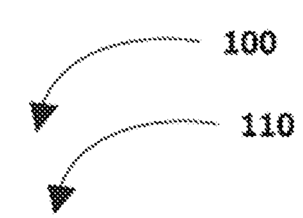
FIG. 3 is a side view illustrating the zipnut according to an embodiment of the present invention of FIG. 1.
Figure 3:
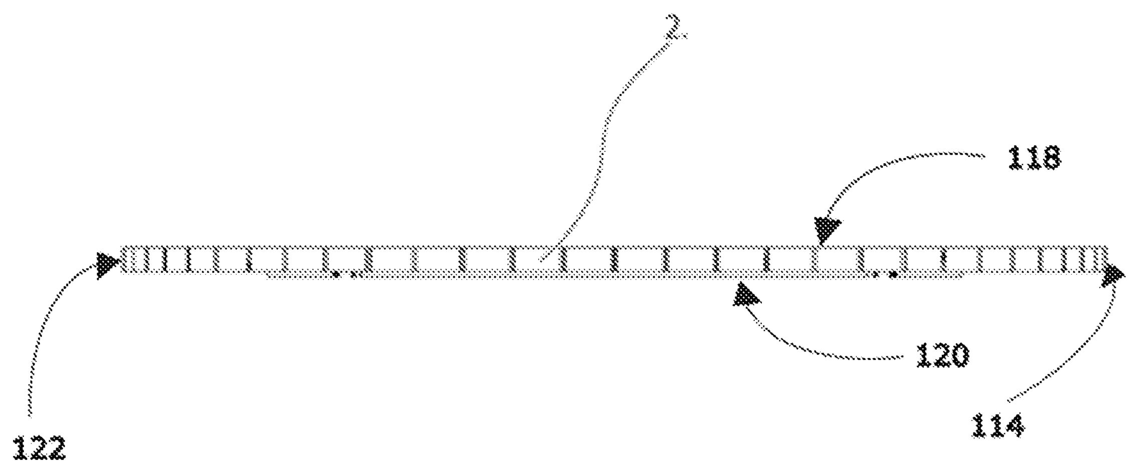
Figure 4:
FIG. 4 is a perspective view illustrating the zipnut according to an embodiment of the present invention of FIG. 1.
Figure 4:
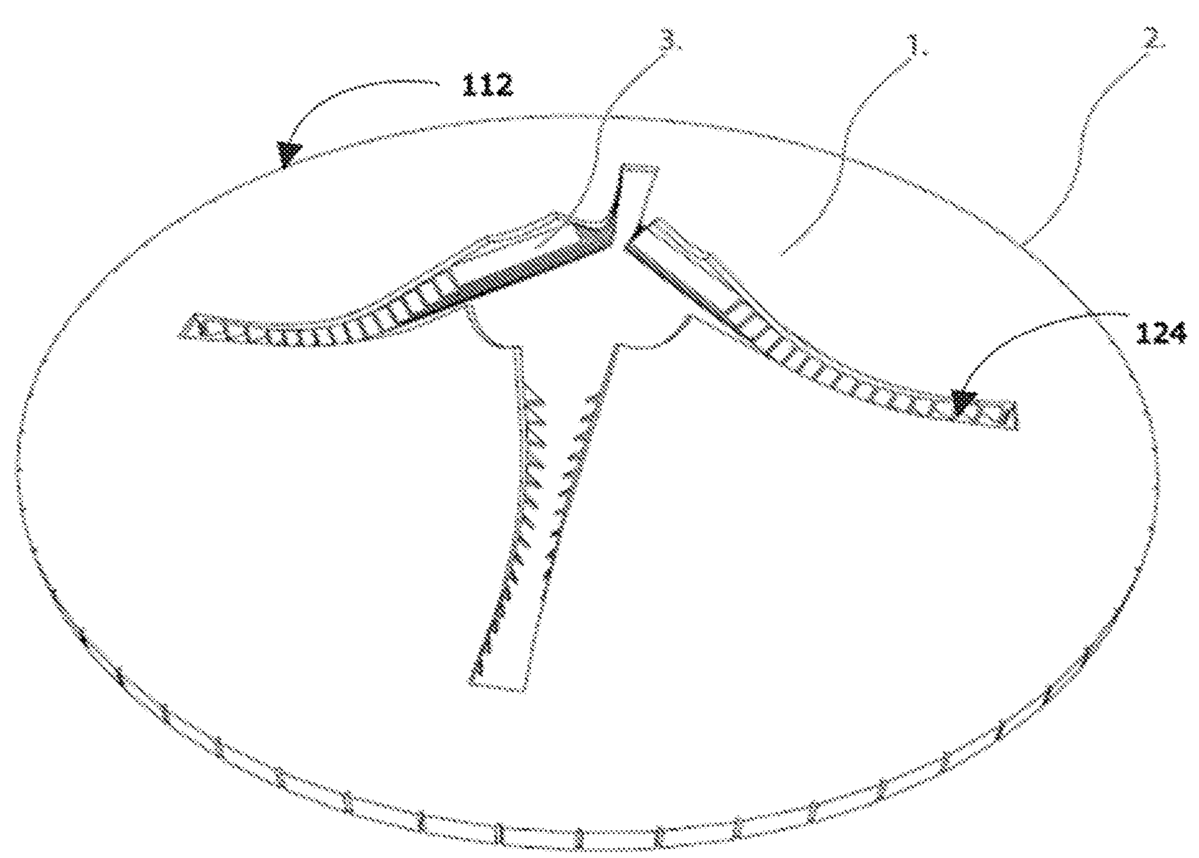
Figure 5:
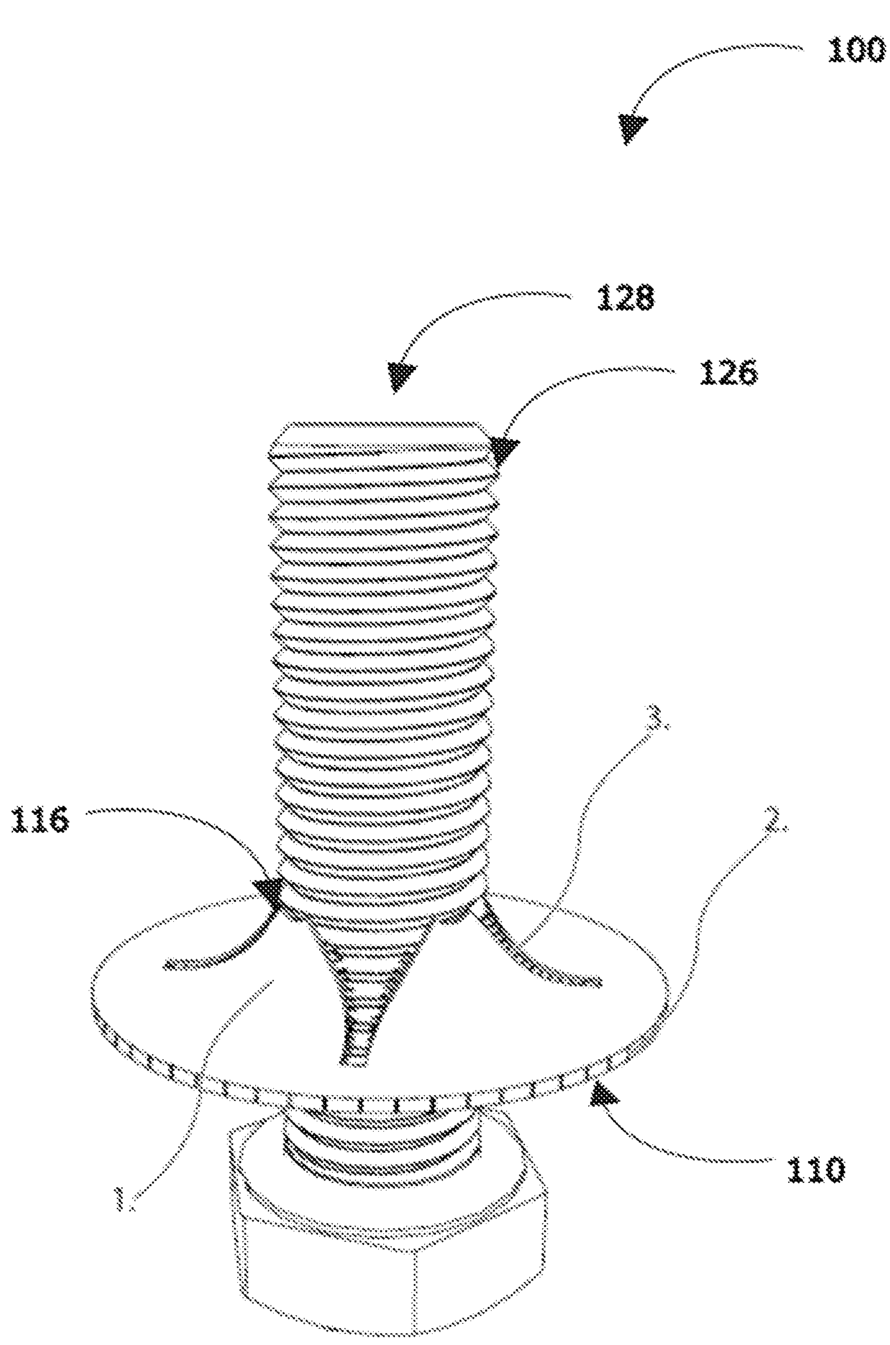
FIG. 5 is a perspective view illustrating the zipnut in use according to an embodiment of the present invention of FIGS. 1-4.

Referring to the drawings by numerals of reference there is shown in FIGS. 1-5, a zipnut system 100 comprising a zipnut 110; flexible vane 1 presses to bolt (fastener 128); serrated edge 2 is used for grip; and fins 3 are shown that feed into and grip the bolt threads of fastener 128 as shown in FIG. 5.

Figure 1:
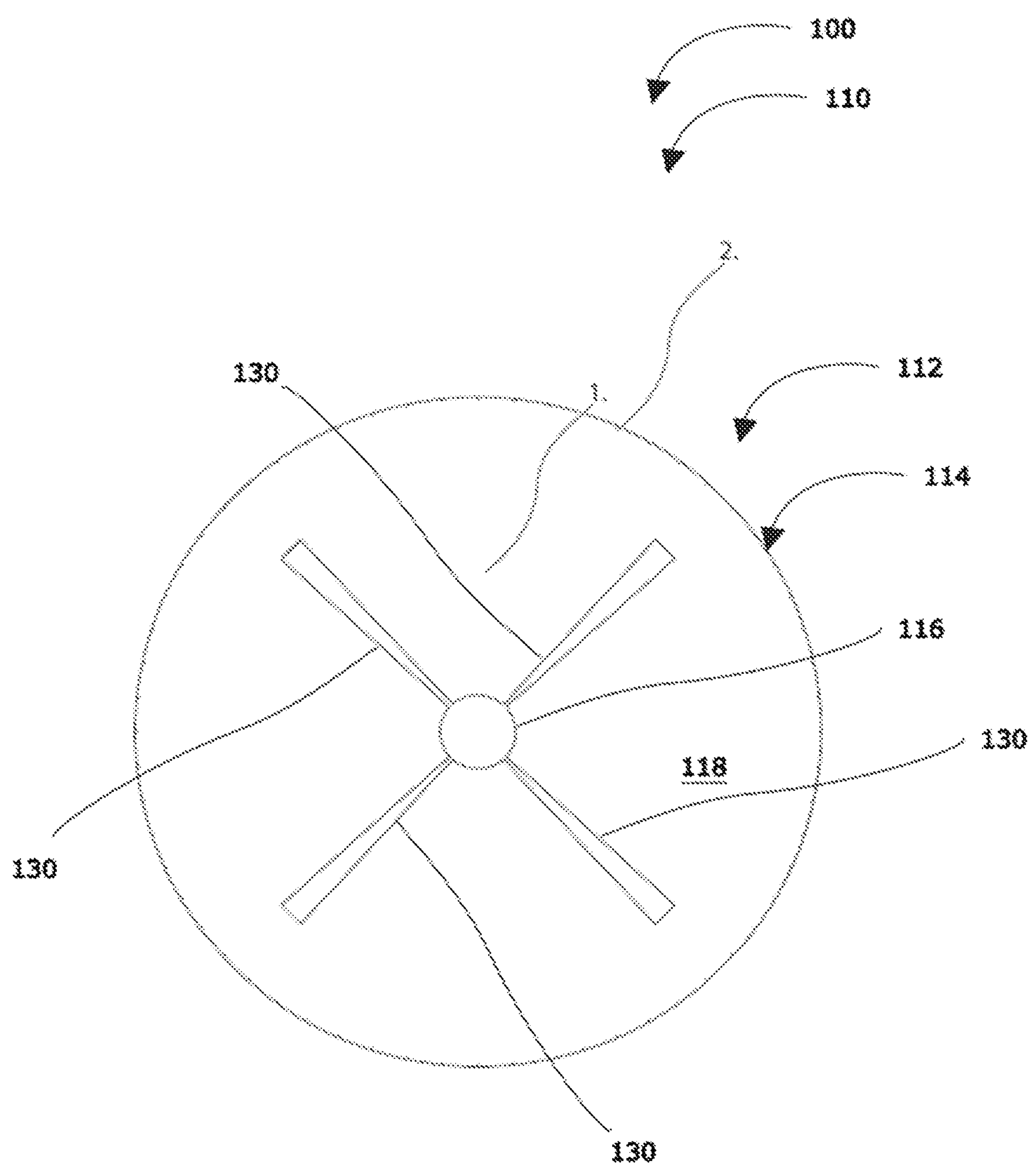
FIG. 1 shows a top view illustrating a zipnut of the zipnut system according to an embodiment of the present invention.
Figure 2:
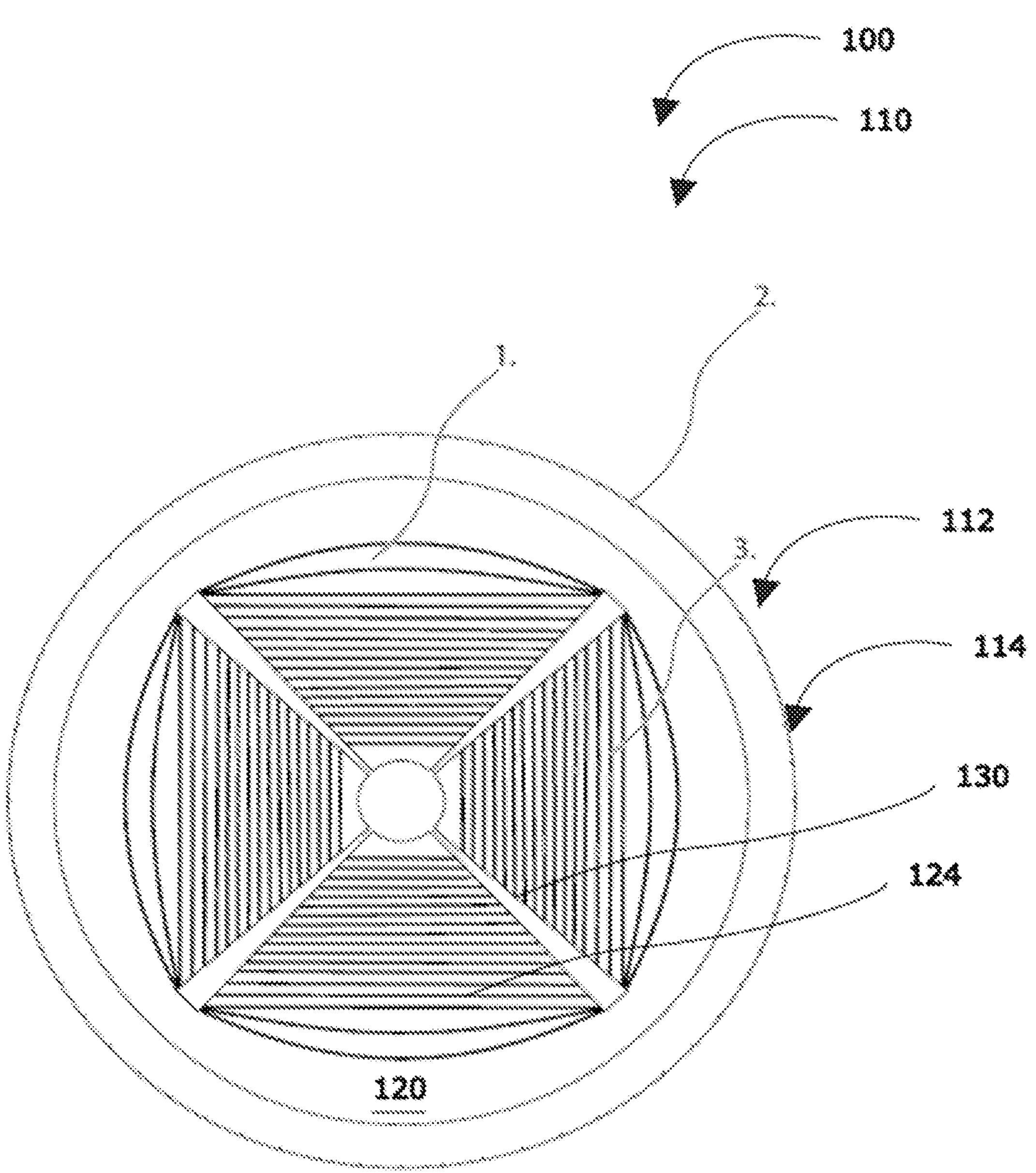
FIG. 2 is a bottom view illustrating the zipnut according to an embodiment of the present invention of FIG. 1.

The zipnut 110 is shown in FIGS. 1-3 in different views to indicate the relationship between the flexible vane 1 which presses to the bolt (fastener 128); the serrated edge 2 for grip; and the fins 3 that feed into and grip the bolt threads. The zipnut 110 is flexible for use, yet sufficiently durable in use. The initial flat profile allows for ease of packing and shipping.

FIG. 3 shows the flat profile of the zipnut 110 before an in-use condition has occurred, such as in FIG. 5. FIG. 4 shows the profile the zipnut 110 transitioned through when entered by the bolt (fastener 128). This is caused by the male-threads 126 of the bolt (fastener 128) engaging with the female-threads 124 of the zipnut 110. As the bolt or other (fastener 128) is threaded through the zipnut 110 it gradually yields to the bolt (fastener 128) as it passes through, yet stays positively engaged. The threading on the zipnut 110 engages according to the male-threads 126 on the bolt (fastener 128). In this way the present invention serves as virtually a 'universal thread' to match whatever thread is on the host bolt (fastener 128).

Referring now more specifically to FIG. 5, the zipnut 110 is shown as fully engaged with the bolt (fastener 128) and how the threads are able to line up. The bolt (fastener 128) may be driven through the zipnut 110 into a coupled relationship and be uncoupled as desired. The top of the zipnut 110 maintains a fairly flat profile to snug it up against the bottom of the bolt (fastener 128) head or the object being held between.

A zipnut system 100 comprises: a zipnut 110 with a flexible circular plate 112 having an outer-circumference 114, an inner-circumference 116, a top-surface 118, a bottom-surface 120, and a thickness 122, wherein the circular plate 112 is defined by the outer-circumference 114 offset from the inner-circumference 116, the top-surface 118 is integral with the bottom-surface 120 via the thickness 122, wherein the top-surface 118 is planar in a non-use condition and deforms accordingly to an extent engaged in an in-use condition, wherein the flexible circular plate 112 comprises at least four channels 130 extending from the inner-circumference 116. The bottom-surface 120 comprises female-threads 124 extending between each of the at least four channels 130, the female-threads 124 oriented at 90 degrees to each adjacent female-thread(s) 124, separated by a respective channel 130, wherein the female-threads 124 are configured to engage with male-threads 126 on a fastener 128 and progressively deform the flexible circular plate 112 as the male-threads 126 rotatingly-advance in relation to the female-threads 124. The zipnut 110 functions to removably secure the fastener to an extent desired.

The at least four channels 130 of the zipnut system 100 form an X-shape or cross-shape, as shown. The at least four channels 130 and the inner-circumference 116 comprise a combined negative volume. The female-threads 124 comprise fins 3 that also function as teeth. The outer-circumference 114 comprises a serrated edge 2. The serrated edge 2 comprises a gripping means for gripping engagement to manipulate the zipnut 110 as desired for tightening and loosening actions. The at least four channels 130 are narrower adjacent to the inner-circumference 116 than as they approach the outer-circumference 114. The zipnut 110 further comprises a flexible vane 132. The flexible vane 132 is substantially arcuate to allow for maximum flexibility. The flexibility is relational to the amount of deformation needed and used. The deformation comprises biasing in compression. The biasing is preferably at a friction-fit tolerance to maintain a positive grip between the zipnut 110 and the fastener 128. The zipnut 110 is able to move exclusively in relation to the fastener 128. The zipnut 110 is able to move in relation to the fastener 128 to attach the fastener 128 to an object. The serrated edge 2 comprises vertical grooves 134 along the outer-circumference 114. The vertical grooves 134 are inset into and limited via the thickness 122.

A method of using a zipnut system 100 comprises the steps of: step one providing a zipnut system 100 including a zipnut 110 with a flexible circular plate 112 having an outer-circumference 114, an inner-circumference 116, a top-surface 118, a bottom-surface 120, and a thickness 122, wherein the circular plate 112 is defined by the outer-circumference 114 offset from the inner-circumference 116, the top-surface 118 integral with the bottom-surface 120 via the thickness 122, wherein the top-surface 118 is planar in a non-use condition and deforms accordingly to an extent engaged in an in-use condition, wherein the flexible circular plate 112 comprises at least four channels 130 extending from the inner-circumference 116, wherein the bottom-surface 120 comprises female-threads 124 extending between each of the at least four channels 130; the female-threads 124 oriented at 90 degrees to each adjacent female-threads 124, separated by a respective channel 130, wherein the female-threads 124 are configured to engage with male-threads 126 on a fastener 128 and progressively deform the flexible circular plate 112 as the male-threads 126 rotatingly-advance in relation to the female-threads 124. The zipnut 110 functions to removably secure the fastener 128 to an extent desired, and step two threadingly engage the fastener 128 with the zipnut 110 to cause a deformation of the zipnut 110. The method may further comprise the step three of tighteningly engage the zipnut 110 in relation to the fastener 128 via the serrated edge 2, and the step four of looseningly engage the zipnut 110 in relation to the fastener 128 via the serrated edge 2.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A zipnut system comprising:
a zipnut with a flexible circular plate having:
an outer-circumference;
an inner-circumference;
a top-surface;
a bottom-surface; and
a thickness;
wherein said circular plate is defined by said outer-circumference offset from said inner-circumference, said top-surface integral with said bottom-surface via said thickness;
wherein said top-surface is planar in a non-use condition and deforms accordingly to an extent engaged in an in-use condition;
wherein said flexible circular plate comprises at least four channels extending from said inner-circumference;
wherein said bottom-surface comprises female-threads extending between each of said at least four channels, said female-threads oriented at 90 degrees to each adjacent said female-threads, separated by a respective said channel;
wherein said female-threads are configured to engage with male-threads on a fastener and progressively deform said flexible circular plate as said male-threads rotatingly-advance in relation to said female-threads; and
wherein said zipnut functions to removably secure said fastener to an extent desired.

2. The zipnut system of claim 1 wherein said at least four channels form an X-shape.

3. The zipnut system of claim 2 wherein each of said at least four channels and said inner-circumference comprise a combined negative volume.

4. The zipnut system of claim 3 wherein said female-threads comprise fins.

5. The zipnut system of claim 4 wherein said outer-circumference comprises a serrated edge.

6. The zipnut system of claim 5 wherein said serrated edge comprises a gripping means for gripping engagement to manipulate said zipnut as desired for tightening and loosening actions.

7. The zipnut system of claim 6 wherein each of said at least four channels are narrower adjacent to the inner-circumference than as they approach the outer-circumference.

8. The zipnut system of claim 7 wherein said zipnut comprises a flexible vane.

9. The zipnut system of claim 8 wherein said flexible vane is arcuate to allow for maximum flexibility.

10. The zipnut system of claim 9 wherein said flexibility is relational to deformation.

11. The zipnut system of claim 10 wherein said deformation comprises biasing in compression.

12. The zipnut system of claim 11 wherein said biasing is at a friction-fit tolerance to maintain a positive grip between said zipnut and said fastener.

13. The zipnut system of claim 12 wherein said zipnut is able to move exclusively in relation to said fastener.

14. The zipnut system of claim 12 wherein said zipnut is able to move in relation to said fastener to attach said fastener to an object.

15. The zipnut system of claim 6 wherein said serrated edge comprises vertical grooves along said outer-circumference.

16. The zipnut system of claim 15 wherein said vertical grooves are inset into and limited via said thickness.

17. A zipnut system comprising:

a zipnut with a flexible circular plate having:
an outer-circumference;
an inner-circumference;
a top-surface;
a bottom-surface; and
a thickness;

wherein said circular plate is defined by said outer-circumference offset from said inner-circumference, said top-surface integral with said bottom-surface via said thickness;

wherein said top-surface is planar in a non-use condition and deforms accordingly to an extent engaged in an in-use condition;

wherein said flexible circular plate comprises at least four channels extending from said inner-circumference;

wherein said bottom-surface comprises female-threads extending between each of said at least four channels, said female-threads oriented at 90 degrees to each adjacent said female-threads, separated by a respective said channel;

wherein said female-threads are configured to engage with male-threads on a fastener and progressively deform said flexible circular plate as said male-threads rotatingly-advance in relation to said female-threads;

wherein said at least four channels form an X-shape;

wherein each of said at least four channels and said inner-circumference comprise a combined negative volume;

wherein said female-threads comprise fins;

wherein said outer-circumference comprises a serrated edge;

wherein said serrated edge comprises a gripping means for gripping engagement to manipulate said zipnut as desired for tightening and loosening actions;

wherein each of said at least four channels are narrower adjacent the inner-circumference than as they approach the outer-circumference;

wherein said zipnut comprises a flexible vane;

wherein said flexible vane is arcuate to allow for maximum flexibility;

wherein said flexibility is relational to deformation;

wherein said deformation comprises biasing in compression;

wherein said biasing is at a friction-fit tolerance to maintain a positive grip between said zipnut and said fastener;

wherein said zipnut is able to move exclusively in relation to said fastener and alternately said zipnut is able to move in relation to said fastener to attach said fastener to an object;

wherein said serrated edge comprises vertical grooves along said outer-circumference;

wherein said vertical grooves are inset into and limited via said thickness; and wherein said zipnut functions to removably secure said fastener to an extent desired.

18. A method of using a zipnut system comprising the steps of:

providing a zipnut system having a zipnut with a flexible circular plate having:
an outer-circumference;
an inner-circumference;
a top-surface;
a bottom-surface; and
a thickness;

wherein said circular plate is defined by said outer-circumference offset from said inner-circumference, said top-surface integral with said bottom-surface via said thickness;

wherein said top-surface is planar in a non-use condition and deforms accordingly to an extent engaged in an in-use condition;

wherein said flexible circular plate comprises at least four channels extending from said inner-circumference;

wherein said bottom-surface comprises female-threads extending between each of said at least four channels, said female-threads oriented at 90 degrees to each adjacent said female-threads, separated by a respective said channel;

wherein said female-threads are configured to engage with male-threads on a fastener and progressively deform said flexible circular plate as said male-threads rotatingly-advance in relation to said female-threads; and wherein said zipnut functions to removably secure said fastener to an extent desired; and threadingly engage said fastener with said zipnut to cause a deformation of said zipnut.

19. The method of claim 18 further comprising the step of tighteningly engage said zipnut in relation to said fastener via said serrated edge.

20. The method of claim 19 further comprising the step of looseningly engage said zipnut in relation to said fastener via said serrated edge.

* * * * *